United States Patent
Yoo (10) Patent No.: US 11,157,787 B2
(45) Date of Patent: Oct. 26, 2021

(54) APPARATUS AND METHOD OF CREATING FIDUCIAL MARKER IMAGE

(71) Applicant: SANGMYUNG UNIVERSITY INDUSTRY-ACADEMY COOPERATION FOUNDATION, Seoul (KR)

(72) Inventor: Hoon Yoo, Suwon-si (KR)

(73) Assignee: SANGMYUNG UNIVERSITY INDUSTRY-ACADEMY COOPERATION FOUNDATION, Seoul (KR)

( * ) Notice: Subject to any disclaimer, the term of this patent is extended or adjusted under 35 U.S.C. 154(b) by 9 days.

(21) Appl. No.: 16/665,183

(22) Filed: Oct. 28, 2019

(65) Prior Publication Data

US 2020/0143213 A1 May 7, 2020

(30) Foreign Application Priority Data

Nov. 5, 2018 (KR) .................. 10-2018-0134194

(51) Int. Cl.
*G06K 19/06* (2006.01)
*G06T 11/00* (2006.01)

(52) U.S. Cl.
CPC ...... *G06K 19/06009* (2013.01); *G06T 11/001* (2013.01)

(58) Field of Classification Search
CPC ............ G06K 19/06; G06K 19/06009; G06K 19/06037; G06K 19/06046; G06T 11/00; G06T 11/001
See application file for complete search history.

(56) References Cited

U.S. PATENT DOCUMENTS

| 10,867,224 | B2 * | 12/2020 | Howard | ............ G06K 19/06075 |
| 2007/0297679 | A1 * | 12/2007 | Sato | ........................ G07F 7/08 382/192 |
| 2016/0042262 | A1 * | 2/2016 | Tanaka | ............ G06K 19/06056 235/494 |
| 2016/0078336 | A1 * | 3/2016 | Ari | ................... G06K 19/06112 235/494 |

* cited by examiner

*Primary Examiner* — Thien M Le
*Assistant Examiner* — April A Taylor
(74) *Attorney, Agent, or Firm* — Sughrue Mion, PLLC (57) ABSTRACT

A method of creating a fiducial marker image includes setting option information about a fiducial marker, calculating size information about each of parameters of the fiducial marker on the basis of the set option information, adding identification (ID) bit information on the basis of the calculated size information to generate a cell matrix, and adding color information to the generated cell matrix to create a fiducial marker image.

20 Claims, 7 Drawing Sheets

MARKER 1-1-1

5Bit-Cells

FIG. 4A

6Bit-Cells

MARKER 1-2-1

FIG. 4B

7Bit-Cells

MARKER 1-1-2

APPARATUS AND METHOD OF CREATING FIDUCIAL MARKER IMAGE

CROSS-REFERENCE TO RELATED APPLICATIONS

This application claims priority under 35 U.S.C. § 119 to Korean Patent Application No. 10-2018-0134194, filed on Nov. 5, 2018, the disclosure of which is incorporated herein by reference in its entirety.

TECHNICAL FIELD

The present invention relates to an apparatus and method of creating a fiducial marker image.

BACKGROUND

Fiducial markers are markers used to extract position information of a physical space and are applied to various fields. The fiducial markers are used as fundamental technology in an automation system conventionally.

Particularly, the fiducial markers are attracting much attention in the automatic medical surgery field recently, and the use scope thereof is progressively expanding as a fundamental tool in an AV/VR system.

The fiducial markers denote special-type markers which are created for high reliably providing information to a specific position of a three-dimensional (3D) space. In order to provide the fiducial markers, active markers and various types of markers are used, and recently, technology based on passive markers is advancing along with computer vision technology.

Since the fiducial markers correspond to various application fields, there are various requirements for designing of markers. For example, there are requirements for small markers, markers having orientation, markers having much identification (ID) bit information, recognition-simplified markers, and markers robust to viewpoint distortion.

The reason that there are various fiducial markers is because fiducial markers are designed based on different application fields. However, there is no marker which is designed to minimize a size of each marker, to maximize the amount of ID bit information, to be easily recognized, and to be robust to viewpoint distortion.

SUMMARY

Accordingly, the present invention provides an apparatus and method of creating a fiducial marker image, in which a physical size of a fiducial marker is minimized, ID bit information is inserted into the fiducial marker as much as possible, and the fiducial marker is robust to viewpoint distortion and provides orientation information.

The objects of the present invention are not limited to the aforesaid, but other objects not described herein will be clearly understood by those skilled in the art from descriptions below.

In one general aspect, a method of creating a fiducial marker image includes setting option information about a fiducial marker, calculating size information about each of parameters of the fiducial marker on the basis of the set option information, adding identification (ID) bit information on the basis of the calculated size information to generate a cell matrix, and adding color information to the generated cell matrix to create a fiducial marker image.

The option information about the fiducial marker may include finder width information, inside width information, and outside width information about the fiducial marker.

The calculating of the size information may include calculating finder width information by using the finder width information and the inside width information and calculating marker length information by using the finder length information and the outside width information.

The generating of the cell matrix may include generating the cell matrix which includes a finder region having a size corresponding to a square of the finder length information and has a square matrix form having a size corresponding to a square of the marker length information.

The generating of the cell matrix may include adding the ID bit information, corresponding to a sum of number of outside insertion bits and number of inside insertion bits in the cell matrix, to the cell matrix.

The setting of the option information may include setting the option information about an orientation option of the fiducial marker, and the orientation option may be set based on four orientation bit patterns located at outer corners of the cell matrix.

When the orientation option is selected, the generating of the cell matrix may include adding the ID bit information, corresponding to a number obtained by subtracting number of orientation bits from a sum of number of outside insertion bits and number of inside insertion bits in the cell matrix, to the cell matrix.

The creating of the fiducial marker image may include adding color information about a finder region of the fiducial marker and information about number of pixels per cell corresponding to the color information to create the fiducial marker image.

The finder region of the fiducial marker may be provided in a closed ring structure and may be disposed inside a pattern where ID bit information is described in the cell matrix.

A margin region provided in one or more of black and white may be provided in the pattern where the ID bit information is described.

The color information may be classified based on mode information about the fiducial marker.

A finder region of the fiducial marker may be provided in a closed ring structure, color information about the finder region may be set as black, and as all of outside insertion bits are set to 1, an AR tag corresponding to number of inside insertion bits of the cell matrix may be provided.

In another general aspect, an apparatus for creating a fiducial marker image includes a memory configured to store a program for generating a fiducial marker image and a processor configured to execute the program stored in the memory, wherein, by executing the program, the processor sets option information about a fiducial marker, calculates size information about each of parameters of the fiducial marker on the basis of the set option information, adds identification (ID) bit information on the basis of the calculated size information to generate a cell matrix, and adds color information to the generated cell matrix to create the fiducial marker image.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

In this disclosure below, when it is described that one comprises (or includes or has) some elements, it should be understood that it may comprise (or include or has) only those elements, or it may comprise (or include or have) other elements as well as those elements if there is no specific limitation.

An optical marker is essential technology for connecting real world to virtual world in a computer system. An optical passive marker and a computer vision system for recognizing the optical passive marker play a very important role as a gateway for entering augmented reality (AR) or virtual world. Therefore, technology using an optical marker is technology essential to many fields.

Figure 1:
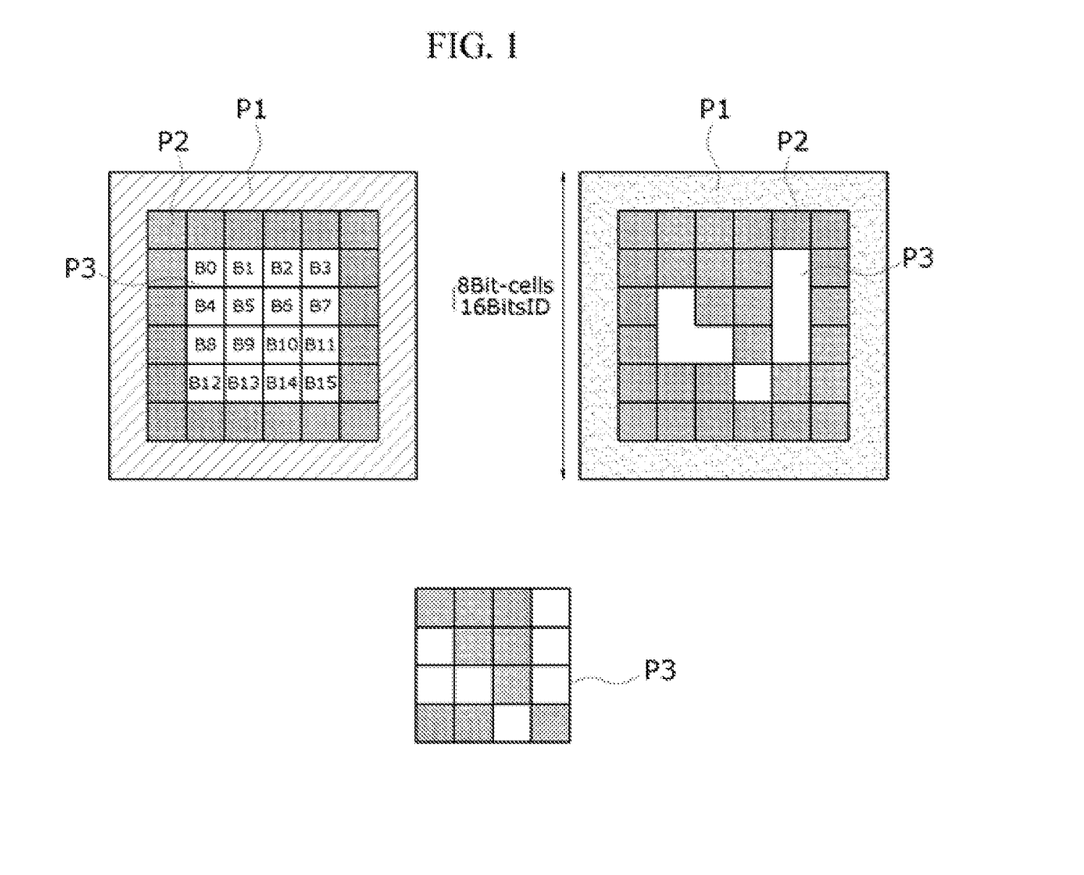
FIG. 1 is a diagram for describing an optical marker of the related art.

FIG. 1 is a diagram for describing an optical marker of the related art.

The optical marker of FIG. 1, AR tag technology, is excellent in marker technology, and thus, is much used in AR field and robot field using AR. In design technology of AR tags, a black boundary is set as a tag region, ID bit information is inserted thereinto, and a margin region for boundary recognition is provided.

In a design option, a size of an inside bit cell is very important.

In the illustration of FIG. 1, a size of an inside bit cell P3 may be 4×4 and may enable insertion of 16-bit information. The number of total cells needed for insertion of 16-bit information may need total sixty-four cells corresponding to an 8×8 size including a bit region P3, a boundary region P2, and a margin region P1. In this case, an average cell unit information bit number may be 16/64 and may represent the space utilization of 25%.

A desired cell size may be proportional to a physical size of a final fiducial marker, and thus, as a cell size decreases, efficiency may increase. This may denote a structure where space utilization increases by increasing the number of information bits on the basis of an option. However, there may be a limitation in that information about a position of a marker is needed or recognition is possible when an outline of a marker is recognized in a square shape through proximity photographing.

Figure 2:
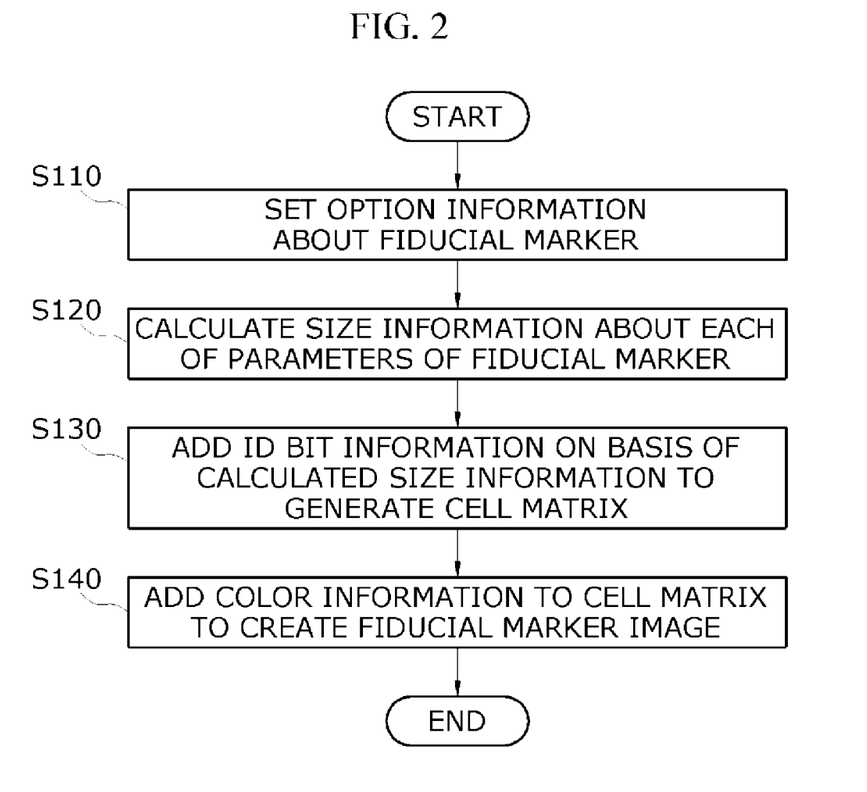
FIG. 2 is a flowchart of a fiducial marker image creating method according to an embodiment of the present invention.

FIG. 2 is a flowchart of a fiducial marker image creating method according to an embodiment of the present invention.

In an embodiment of the present invention for designing an efficient optical marker, a fiducial marker may include maximum bit information when having a minimum size. That is, in a marker design, it is very important to minimize the number of bit cells of the fiducial marker. This is because, when the number of total cells needed for a marker design is reduced based on bit information, a physical size of a fiducial marker is actually reduced in proportion thereto.

To this end, in the fiducial marker image creating method according to an embodiment of the present invention, the fiducial marker image creating apparatus may set option information for designing of a fiducial marker in step S110. In this case, content of an output corresponding to the set option information may be defined together.

The option information about the fiducial marker may include finder width information, inside width information, and outside width information about the fiducial marker.

In an embodiment of the present invention, an option of the fiducial marker may have the form of 'Marker-number-number-number'. That is, the option of the fiducial marker may have the form of 'Marker i-j-k'. For example, when all of integers 'i, j, and k' are 1, the option may be a Marker 1-1-1 mode.

Subsequently, in step S120, the fiducial marker image creating apparatus may calculate size information about each of parameters of the fiducial marker on the basis of the set option information.

In this case, in an embodiment of the present invention, the fiducial marker image creating apparatus may calculate finder width length information by using the finder width information and the inside width information and may calculate marker length information by using the finder length information and the outside width information.

Subsequently, when options of a marker are set based on each of variables and the size information is calculated, the fiducial marker image creating apparatus may add ID bit information on the basis of the calculated size information to generate a cell matrix in step S130.

In this case, a final size of the cell matrix may be defined as the square "m×m" of marker length information. That is, the generated cell matrix may include a finder region having a size corresponding to the square of the finder length information and may have a square matrix form having a size corresponding to the square of the marker length information.

A number "2" may be added to a portion corresponding to a finder of the marker in the cell matrix, and a bit "0" or "1" corresponding to input ID data may be inserted into another bit information portion.

In an embodiment of the present invention, the number of total insertable bits may be a sum of the number of outside insertion bits and the number of inside insertion bits in the cell matrix, and ID bit information equal to a corresponding number may be added to the cell matrix.

In this case, when an orientation option of the fiducial marker is set together in a preceding step of setting the option information about the fiducial marker, the number of total insertable bits may be a number obtained by subtracting the number of orientation bits corresponding to the orientation option from the sum of the number of outside insertion bits and the number of inside insertion bits in the cell matrix, and ID bit information equal to a corresponding number may be added to the cell matrix.

When the number of total insertion bits is determined based on the option information, the number of total pieces of ID bit information available as ID may be defined as $2^n$ BitID. In this case, the orientation option may be set based on a pattern of four orientation bits located at an outer corner of the cell matrix. For example, when the orientation option is defined as a patter "0111" in a counterclockwise direction with respect to a left upper corner, an orientation (i.e., an angle) of the marker may be measured based on shapes of four corners of the marker.

Variable information such as a size and the option information defined in an embodiment of the present invention may be arranged as in the following Table 1.

TABLE 1

| Marker i-j-k | Variables | Notes |
|---|---|---|
| Finder width information (Finder width) | i | Option information (Design parameter) |
| Inside width information (Inside width) | j | Option information (Design parameter) |
| Outside width information (Outside width) | k | Option information (Design parameter) |
| Orientation bit information (Flag bit for orientation) | f | Option information (Design parameter) |
| Finder length information (Finder length) | n | $n = 2i + j$ |
| Marker length information (Marker length) | m | $m = 2i + j + 2k = n + 2k$ |
| Number of outside insertion bits (Number of outside bits) | nBitOut | $nBitOut = m^2 - n^2 = 4k(n + k)$ |
| Number of inside insertion bits (Number of inside bits) | nBitIn | $nBitIn = j^2$ |
| Number of total pieces of ID bit information (Number of total ID bits) | nBitID | $nBitID = nBitOut + nBitIn - 4f$ |

After the cell matrix is defined, the fiducial marker image creating apparatus may add color information to the generated cell matrix to create a fiducial marker image in step S140.

In this case, desired information may include color information about a finder region of the fiducial marker and the number of pixels per cell corresponding to the color information. Here, the minimum number of pixels per cell may be 1.

Generally, determination of the number of pixels may be changed based on a final physical size of the fiducial marker. For example, when a cell picture size of a marker which is to be output as 300 dpi is set to ⅓ inches, the number of pixels per cell may be 100 pixels.

Figure 3:
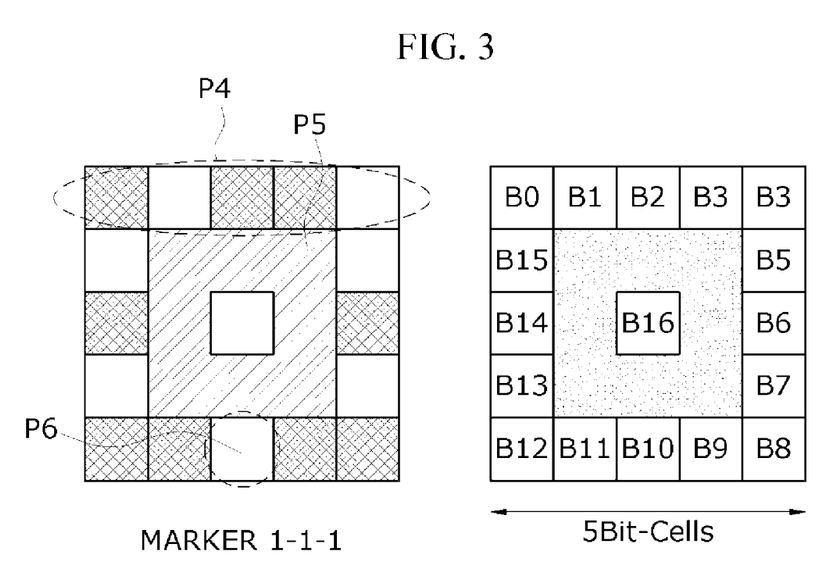
FIG. 3 is a diagram illustrating an example of a fiducial marker created to have a minimum size in an embodiment of the present invention.

FIG. 3 is a diagram illustrating an example of a fiducial marker created to have a minimum size in an embodiment of the present invention.

In FIG. 3, a created fiducial marker may be set to Marker 1-1-1. That is, the created fiducial marker may be a fiducial marker configured in units of total 5×5 cells where a finder width is 1, an inside width is 1, and an outside width is 1.

Information about total 17 bits may be inserted into the fiducial marker, and when four bits corresponding to orientation bits are excluded, the number of total IDs corresponding 13 bits may be defined as 8,192.

In FIG. 3, a color of a finder region P5 may be defined as green, and in an embodiment of the present invention, the color may be freely defined as option information.

Moreover, color information about the finder region P5 may be used as mode information about the fiducial marker. That is, the color information may be used to be classified based on the mode information about the fiducial marker. For example, in the color information, Marker 1-1-1 may be defined as green, and Marker 1-2-1 may be defined as red, thereby classifying the mode information about the fiducial marker.

A pattern of the finder region P5 may be the most important in detecting the fiducial marker from a global region of an input image. In an embodiment of the present invention, the finder region P5 may be provided in a closed ring structure, and the finder region P5 provided in the closed ring structure may be disposed in a bit pattern region P4 where ID bit information about the cell matrix is described.

Such a structure may have a shape which is uncommon geometrically and may be differentiated from a background portion of an image. Also, the structure may use a recognition portion of an QR code using a ring structure.

Furthermore, in an embodiment of the present invention, the finder region P5 may use color information, and thus, may be differentiated from a bit information region P6. By using the finder region P5, the bit information region P6 where a bit pattern is provided may be disposed outside the finder region P5, and by using the finder region P5, bit data may be effectively inserted thereinto.

That is, the fiducial marker image creating method according to an embodiment of the present invention may be characterized in that the bit pattern region P4 with ID bit information inserted thereinto is disposed outside a pattern of the finder region P5. Therefore, even when a margin region for recognizing the finder region P5 is added as a black image to the bit information region P6 with real ID bit information inserted thereinto, the margin region may be differentiated from color information, and thus, bit insertion efficiency may be actually maximized. For reference, all markers which are industrially vitalized like an AR tag or a QR code may need the margin region for detection.

According to an embodiment of the present invention, various types of fiducial markers may be created.

Generally, in designing of a fiducial marker, important information may be mainly determined based on a physical structure of a system requiring the fiducial marker. Particularly, a physical size of a fiducial marker may correspond to very important information, and based on a recognition environment of the fiducial marker, a physical size of a pattern of a finder region may be very important.

In an embodiment of the present invention, such features may be easily solved and provided, and moreover, a created fiducial marker may provide a very efficient structure in term of a bit insertion rate with respect to a physical size thereof.

Figure 4A:
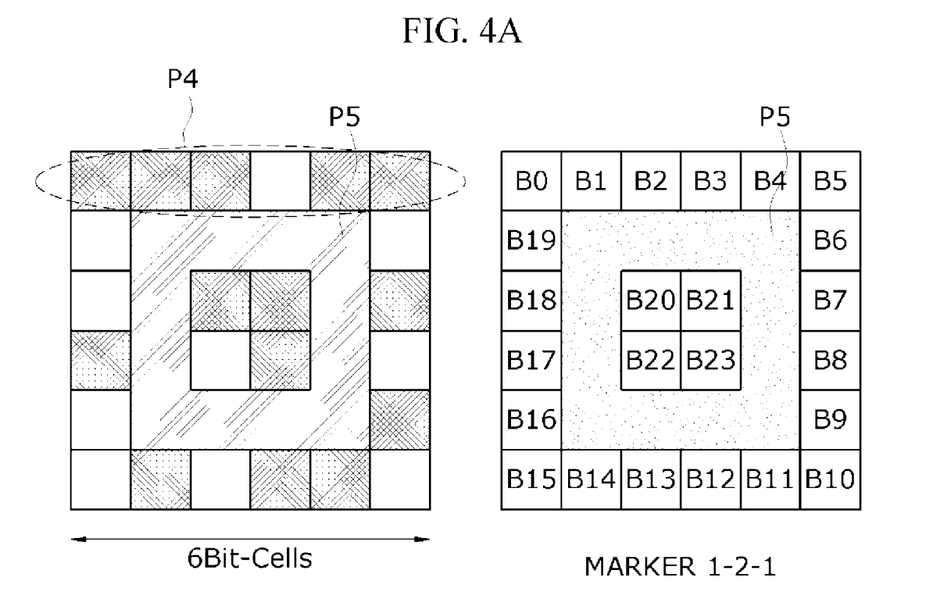
FIGS. 4A to 4C are diagrams for describing various embodiments of a fiducial marker.
Figure 4B:
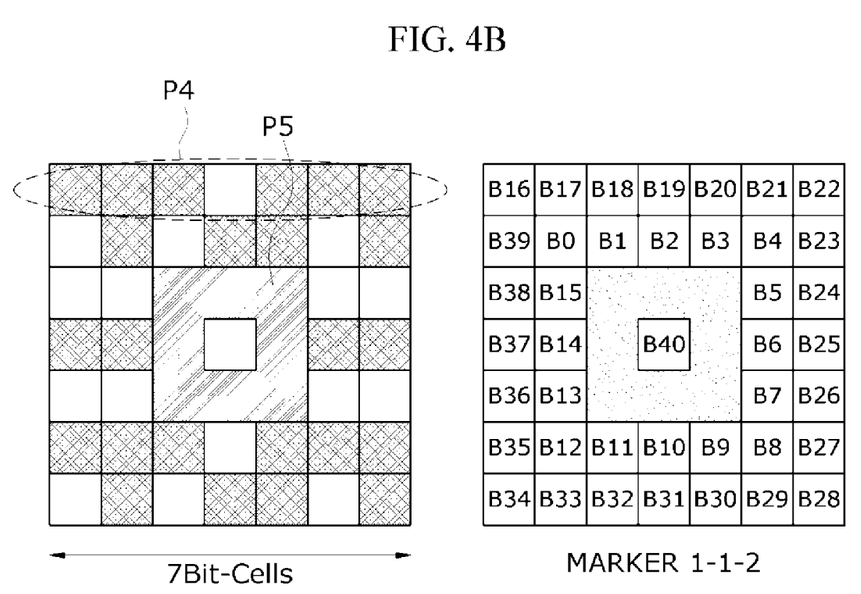
Figure 4C:
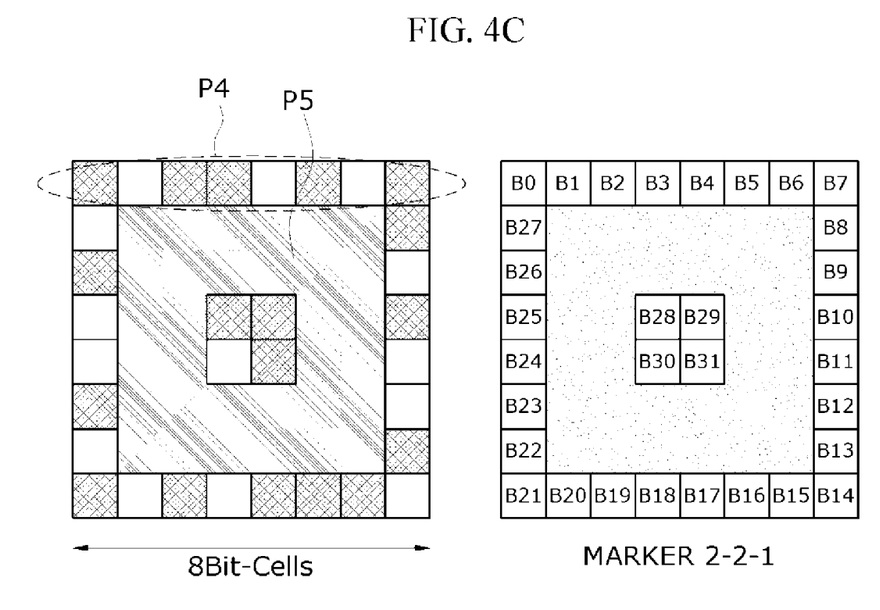

FIGS. 4A to 4C are diagrams for describing various embodiments of a fiducial marker.

FIG. 4A illustrates a case where a fiducial marker is Marker 1-2-1. In the Marker 1-2-1, an option may be set in a direction in which the number of inside bits increase. In the Marker 1-2-1, a size of a finder region P5 may be defined as 4×4 and may be recognized at a more remote distance, a cell size may be minimized to 6×6.

FIG. 4B illustrates a case where a fiducial marker is Marker 1-1-2. In the Marker 1-1-2, a size of a finder region P5 may be limited to a minimum size and may be used by inserting many bits into an outer region P4.

FIG. 4C illustrates a case where a fiducial marker is Marker 2-2-1, and in this case, a size of a finder region P5 may be designed to a size which is twice an ID bit cell P4. This may provide a structure which is efficiently recognized at a remote distance, and thus, may use a camera which is low in resolution.

In addition, in the fiducial marker image creating method according to an embodiment of the present invention, various types having a Marker i-j-k design structure may be easily analogized and used.

Technical performance evaluation performed on the fiducial marker image creating method according to an embodiment of the present invention may be as listed in the following Table 2.

TABLE 2

|  | # of ID bits | # of Cells | Bits/Cell | Efficiency |
| --- | --- | --- | --- | --- |
| AR tag (16 bit) | 16 | 8 × 8 | 0.250 | 1.00 |
| Marker 1-1-1 | 17 | 5 × 5 | 0.680 | 2.72 |
| Marker 1-2-1 | 24 | 6 × 6 | 0.667 | 2.67 |
| Marker 1-1-2 | 41 | 7 × 7 | 0.837 | 3.35 |
| Marker 2-2-1 | 32 | 8 × 8 | 0.500 | 2.00 |

According to an embodiment of the present invention, it may be checked that a performance improvement effect of each fiducial marker according to an embodiment described above with reference to the drawings is at least 2 to 3.35 times that of an AR tag method of the related art. Also, a higher improvement effect may be expected based on a design method.

Additionally, in an embodiment of the present invention, a 16-bit AR tag may be generated according to a proposed method.

For example, when option information is set to Marker 1-4-1, a finder size may be 1, an inside insertion bit may be 4×4=16, and a size of an outside insertion bit may be 1. Here, color information about a finder region provided in a closed ring structure may be designated as black, and an outside insertion bit may be set to 1, thereby generating an AR tag corresponding to the number of inside insertion bits of the cell matrix.

In description given above, steps S110 to S140 may be further divided into additional steps or may be combined as fewer steps, based on an implementation embodiment of the present invention. Also, some steps may be omitted depending on the case, and a sequence of steps may be changed.

Figure 5:
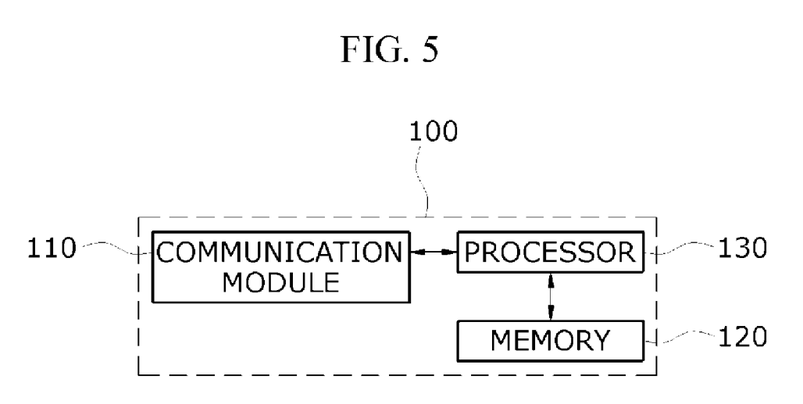
FIG. 5 is a block diagram of a fiducial marker image creating apparatus according to an embodiment of the present invention.

FIG. 5 is a block diagram of a fiducial marker image creating apparatus 100 according to an embodiment of the present invention.

The fiducial marker image creating method according to an embodiment of the present invention may be performed by the fiducial marker image creating apparatus 100 according to an embodiment of the present invention, and the fiducial marker image creating apparatus 100 may include a communication module 110, a memory 120, a database 130, and a processor 140.

The communication module 110 may receive option information input through a user terminal or a user interface and may finally transmit a created fiducial marker image. The communication module 110 may include a wired communication module and a wireless communication module. The wired communication module may be implemented with a power line communication device, a telephone wire communication device, a cable home (MoCA), Ethernet, IEEE1294, an integration wired home network, an RS-485 control device, and/or the like. Also, the wireless communication module may be implemented with wireless local area network (WLAN), Bluetooth, HDR WPAN, UWB, ZigBee, Impulse Radio, 60 GHz WPAN, Binary-CDMA, wireless USB technology, wireless HDMI technology, and/or the like.

The memory 120 may store a program for creating a fiducial marker image, and the processor 130 may execute the program stored in the memory 120. Here, the memory 120 may denote a generic name for a volatile memory device and a non-volatile memory device which continuously maintains stored information even when power is cut off.

Examples of the memory 120 may include NAND flash memory such as compact flash (CF) card, secure digital (SD) card, memory stick, solid state drive (SSD), and micro SD card, magnetic computer memory device such as hard disk drive (HDD), and optical disc drive such as CD-ROM and DVD-ROM.

For reference, the elements according to an embodiment of the present invention illustrated in FIG. 2 may be implemented as software or a hardware type such as field programmable gate array (FPGA) or application specific integrated circuit (ASIC) and may perform certain functions.

However, "elements" are not meanings limited to software or hardware, and each element may be configured to reside in an addressable storage medium and configured to execute on one or more processors.

Thus, an element may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

Furthermore, despite other omitted descriptions, descriptions given already on the fiducial marker image creating method with reference to FIGS. 1 to 4C may be applied to the fiducial marker image creating apparatus of FIG. 5.

The method according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiments of the present invention have been described in association with a specific embodiment, but their elements, some operations, or all operations may be implemented by using a computer system having general-use hardware architecture.

As described above, a physical size of a fiducial marker according to the embodiments of the present invention may be minimized, and moreover, ID bit information may be inserted into the fiducial marker as much as possible. Also, the fiducial marker according to the embodiments of the present invention may be robust to viewpoint distortion and may provide orientation information.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of creating a fiducial marker image by using a fiducial marker image creating apparatus, the fiducial marker image creating apparatus comprising at least one processor, the method comprising:
   receiving, by the at least one processor, an input of setting finder width information indicating a width of a cell in a finder region in a fiducial marker, an input of setting inside width information indicating a width of an inside bit cell in the fiducial marker, and an input of setting outside width information indicating a width of an outside bit cell in the fiducial marker;
   obtaining, by the at least one processor, marker length information, indicating a length of the fiducial marker, based on a preset relationship between the finder width information, the inside width information, and the outside width information;
   adding, by the at least one processor, identification (ID) bit information based on the obtained marker length information to generate a cell matrix, the cell matrix having a size determined based on the marker length information;
   adding, by the at least one processor, color information to the generated cell matrix to create the fiducial marker image; and
   providing, by the at least one processor to a computer vision system, the created fiducial marker image, upon which position information of a physical space is extracted.

2. The method of claim 1, wherein the obtaining of the marker length information comprises obtaining finder length information, indicating a length of the finder region, by using the finder width information and the inside width information, and obtaining the marker length information by using the finder length information and the outside width information.

3. The method of claim 2, wherein the generating of the cell matrix comprises generating the cell matrix which includes the finder region having a size corresponding to a square of the length indicated by the finder length information, the cell matrix having a square matrix form having a size corresponding to a square of the length indicated by the marker length information.

4. The method of claim 1, wherein the generating of the cell matrix comprises adding the ID bit information, corresponding to a sum of a number of outside insertion bits and a number of inside insertion bits in the cell matrix, to the cell matrix.

5. The method of claim 1, wherein
   the receiving comprises receiving, by the at least one processor, an input of setting an orientation of the fiducial marker, and
   the orientation of the fiducial marker is represented based on four orientation bit patterns located at outer corners of the cell matrix.

6. The method of claim 5, wherein the generating of the cell matrix comprises adding the ID bit information, corresponding to a number obtained by subtracting a number of orientation bits from a sum of a number of outside insertion bits and a number of inside insertion bits in the cell matrix, to the cell matrix.

7. The method of claim 1, wherein the creating of the fiducial marker image comprises adding color information about the finder region of the fiducial marker and information about a number of pixels per cell corresponding to the color information to create the fiducial marker image.

8. The method of claim 1, wherein the finder region of the fiducial marker is provided in a closed ring structure and is disposed inside a pattern where ID bit information is described in the cell matrix.

9. The method of claim 8, wherein a margin region, which is provided in one or more of a black color and a white color, is provided in the pattern where the ID bit information is described.

10. The method of claim 1, wherein the color information is classified based on mode information about the fiducial marker.

11. The method of claim 1, wherein
   the finder region of the fiducial marker is provided in a closed ring structure, and
   color information about the finder region is set as a black color, and as all of outside insertion bits are set to 1, an augmented reality (AR) tag corresponding to a number of inside insertion bits of the cell matrix is provided.

12. An apparatus for creating a fiducial marker image, the apparatus comprising:
   a memory configured to store a program for generating the fiducial marker image; and
   a processor configured to execute the program stored in the memory to perform:
      receiving an input of setting finder width information indicating a width of a cell in a finder region in a fiducial marker, an input of setting inside width information indicating a width of an inside bit cell in the fiducial marker, and an input of setting outside width information indicating a width of an outside bit cell in the fiducial marker;
      obtaining marker length information, indicating a length of the fiducial marker, based on a preset relationship between the finder width information, the inside width information, and the outside width information;
      adding identification (ID) bit information based on the obtained marker length information to generate a cell matrix, the cell matrix having a size determined based on the marker length information;
      adding color information to the generated cell matrix to create the fiducial marker image; and
      providing, to a computer vision system, the created fiducial marker image, upon which position information of a physical space is extracted.

13. The apparatus of claim 12, wherein the processor is further configured to execute the program to perform:
obtaining finder length information, indicating a length of the finder region, by using the finder width information and the inside width information, and obtaining the marker length information by using the finder length information and the outside width information.

14. The apparatus of claim 13, wherein the processor is further configured to execute the program to perform:
generating the cell matrix which includes the finder region having a size corresponding to a square of the length indicated by the finder length information, the cell matrix having a square matrix form having a size corresponding to a square of the length indicated by the marker length information.

15. The apparatus of claim 12, wherein the processor is further configured to execute the program to perform:
adding the ID bit information, corresponding to a sum of a number of outside insertion bits and a number of inside insertion bits in the cell matrix, to the cell matrix.

16. The apparatus of claim 12, wherein the processor is further configured to execute the program to perform:
receiving an input of setting an orientation of the fiducial marker, the orientation of the fiducial marker being represented based on four orientation bit patterns located at outer corners of the cell matrix.

17. The apparatus of claim 16, wherein the processor is further configured to execute the program to perform:
adding the ID bit information, corresponding to a number obtained by subtracting a number of orientation bits from a sum of a number of outside insertion bits and a number of inside insertion bits in the cell matrix, to the cell matrix.

18. The apparatus of claim 12, wherein the processor is further configured to execute the program to perform:
adding color information about the finder region of the fiducial marker and information about a number of pixels per cell corresponding to the color information to create the fiducial marker image.

19. The apparatus of claim 12, wherein the finder region of the fiducial marker is provided in a closed ring structure and is disposed inside a pattern where ID bit information is described in the cell matrix.

20. A non-transitory computer-readable storage medium, storing computer-readable instructions, the computer-readable instructions, when executed by one or more processors, causing the one or more processors to perform:
receiving an input of setting finder width information indicating a width of a cell in a finder region in a fiducial marker, an input of setting inside width information indicating a width of an inside bit cell in the fiducial marker, and an input of setting outside width information indicating a width of an outside bit cell in the fiducial marker;
obtaining marker length information, indicating a length of the fiducial marker, based on a preset relationship between the finder width information, the inside width information, and the outside width information;
adding identification (ID) bit information based on the obtained marker length information to generate a cell matrix, the cell matrix having a size determined based on the marker length information;
adding color information to the generated cell matrix to create a fiducial marker image; and
providing the created fiducial marker image, upon which position information of a physical space is extracted.

* * * * *